United States Patent [19]

Bosne

[11] 4,380,517
[45] Apr. 19, 1983

[54] ICE PREVENTING APPARATUS AND METHOD FOR GAS AND LIQUID CONTACT MEANS OF AN ATMOSPHERIC COOLING TOWER

[75] Inventor: Jacques G. P. E. Bosne, Viroflay, France

[73] Assignee: Hamon-Sobelco, S.A., Brussels, Belgium

[21] Appl. No.: 348,752

[22] Filed: Feb. 16, 1982

[51] Int. Cl.³ .............................................. B01F 3/04
[52] U.S. Cl. .................................. 261/142; 261/109; 261/DIG. 11
[58] Field of Search ................. 261/109, 142, DIG. 11

[56] References Cited

U.S. PATENT DOCUMENTS

| | | | |
|---|---|---|---|
| 3,117,170 | 1/1964 | Mart et al. | 261/DIG. 11 |
| 3,880,964 | 4/1975 | Fordyce et al. | 261/DIG. 11 |
| 3,925,523 | 12/1975 | Cates | 261/109 |
| 4,048,265 | 9/1977 | Fordyce et al. | 261/DIG. 11 |
| 4,129,625 | 12/1978 | Fordyce et al. | 261/DIG. 11 |

FOREIGN PATENT DOCUMENTS 2748331 5/1979 Fed. Rep. of Germany .
2901156 7/1980 Fed. Rep. of Germany .
1065807 11/1951 France .
1475491 4/1965 France .
2266134 10/1975 France .
827971 10/1960 United Kingdom .

Primary Examiner—Tim R. Miles
Attorney, Agent, or Firm—Kerkam, Stowell, Kondracki & Clarke

[57] ABSTRACT

The process avoids, in a cold period, the formation of ice inside a cooler having lower air inlets and employing atmospheric air and a freezable liquid stream. The process comprises providing the air inlet apertures with vertical metal trellises which extend in a part of the apertures from the top of the latter downwardly. In cold periods, cold water is caused to stream along the trellises so as to form, under controlled conditions, curtains of ice on the trellises which partly close the apertures. When the temperature of the air, and consequently the temperature of the water cooled inside the cooler, resumes a sufficiently high temperature to avoid the formation of ice inside the cooler, the curtains of ice formed on the trellises are melted.

9 Claims, 4 Drawing Figures

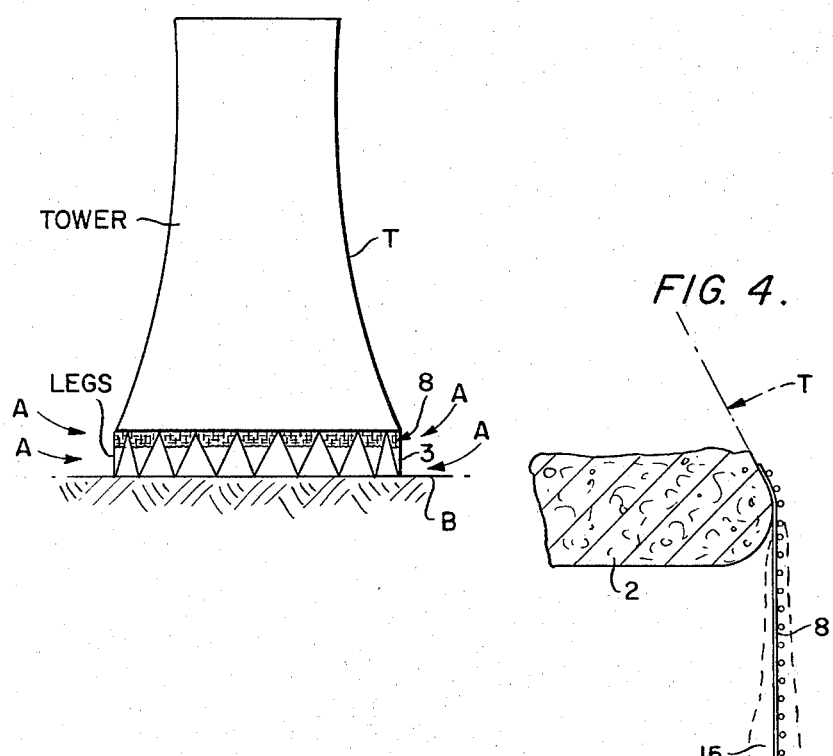
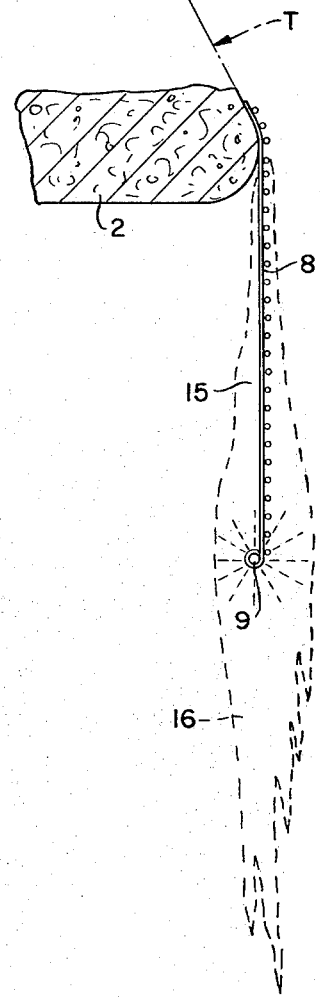
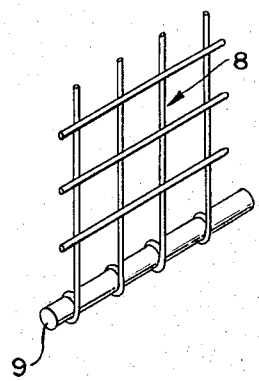

ICE PREVENTING APPARATUS AND METHOD FOR GAS AND LIQUID CONTACT MEANS OF AN ATMOSPHERIC COOLING TOWER

FIELD OF THE INVENTION

The present invention relates to installations for cooling a liquid by means of a gas and more particularly to coolers employing atmospheric air and a liquid stream in which industrial waters are cooled by the air.

These installations are usually in the form of towers in which the water to be cooled is put in contact, in a liquid streaming device, with the air which enters by way of substantially vertical lower apertures in the tower wall.

In a frosty period, ice is formed on these liquid streaming devices in the region of the air inlets and the weight of this ice may break the streaming devices.

Consequently, it is well to avoid the formation of ice inside coolers employing atmospheric air and a liquid stream.

BACKGROUND OF THE INVENTION

The applicant has already proposed in its patent FR-A-No. 74 11 166 an installation which has two supply circuits for the water to be cooled and permits during freezing periods, supplying water only to the parts of the streaming device which are in the neighborhood of the air inlet. Such an installation, however, requires two supply circuits and a system of valves for the purpose of changing from the supply of water to the whole of the streaming device to the supply of water to only peripheral parts.

BRIEF SUMMARY OF THE INVENTION

The object of the present invention is to avoid the formation of ice inside liquid coolers employing atmospheric air, as the cooling medium, in a simpler and cheaper manner.

For this purpose, the present invention provides a process for avoiding, in a cold period, the formation of ice inside a cooler which employs air and a liquid stream and has lower air inlet apertures, characterized in that the air inlet apertures are provided with vertical metal trellises which extend in an upper part of the apertures and causing in a frosty period, cold water to stream along said trellises so as to form under controlled conditions on said trellises curtains of ice which partly close the air inlet apertures, and, when the temperature of the air and consequently the temperature of the water cooled inside the cooler, resumes a sufficiently high temperature to avoid formation of ice inside the cooler, melting the curtains of ice.

Another object of the present invention is to provide a cooler employing atmospheric air and a liquid stream and having lower air inlet apertures characterized in that it comprises vertical metal trellises which extend in an upper part of the air inlet apertures, means for causing cold water to stream along said trellises, and means for melting the ice formed on said trellises.

Thus, according to the present invention, in a frosty period, a curtain of ice is deliberately created which closes to a given extent in height the cold air inlet apertures. The height may be adjusted, on the one hand, by the height of the metal trellises and, on the other hand, by the amount of water which is frozen on the trellises. The curtain of ice may extend down to a level which is distinctly lower than the level of the trellises provided a sufficient amount of cold water is made to stream along the trellises. In this way, the volume of air entering the cooler may be adjusted in accordance with its temperature.

When the temperature of the air, and consequently the temperature of the water cooled inside the cooler, is sufficiently high to avoid formation of ice on the streaming devices, it is then advisable, in order to achieve optimal operation, to increase the amount of air entering the cooler, the ice is melted from the trellises. This may be achieved by causing a large amount of hot water to stream along the curtains of ice. This is a particularly advantageous solution in such an installation where hot water is the liquid to be cooled in the tower.

However, melting of the curtains of ice may be accelerated by heating means which are fixed to the metal trellises or constitute at least some of the elements of these trellises. In a preferred embodiment, the heating means are disposed at the lower end of each metal trellis so as to rapidly detach the ice below this trellis. The heating means may comprise electric resistances, or stream or hot water pipes.

BRIEF DESCRIPTION OF THE DRAWINGS

The invention is described hereinafter in more detail with reference to the drawings which represent only one embodiment.

In the drawings:

FIG. 1 is a diagrammatic elevational view of a typical cooling tower having installed there on the means of the present invention;

FIG. 3 is a perspective view, to an enlarged scale, of the metal trellis shown in FIGS. 1 and 2; and FIG. 4 is a sectional view representing the inlet of the cooler which is partly closed by a curtain of ice.

DETAILED DESCRIPTION OF A PREFERRED EMBODIMENT OF THE INVENTION

Figure 2:
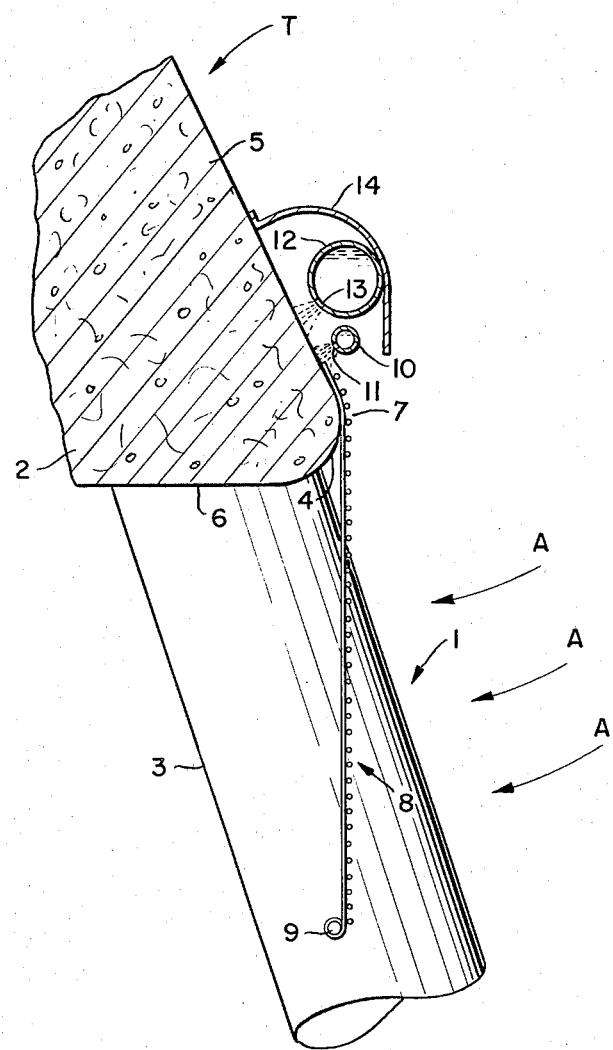
FIG. 2 is an enlarged sectional view of the inlet of the cooler of FIG. 1.

An air inlet aperture 1 of a tower T of a cooler employing atmospheric air is represented in FIGS. 1, 2 and 4. The inlet 1 is defined by a lintel 2 of concrete. The tower is supported by diagonal cross-members, such as 3 above a base B.

The lintel comprises a rounded outer lower edge 4 which connects the inclined outer wall 5 of the tower T to the lower horizontal wall 6 of the lintel. Fixed in the upper part of this rounded edge 4 is the upper end 7 of a metal trellis 8 which is thus suspended form the lintel 2 outside the cooling tower and extends between two diagonal cross-members or legs such as 3.

The metal trellis is formed by metal bars (having for example, a diameter of 6 to 8 mm), some of which, as shown in FIG. 3, are disposed horizontally whereas others are disposed vertically so as to form square meshes. These meshes may have for example, a dimension of 50 to 100 mm.

Fixed at the lower end of the trellis 8 is an electric resistance element 9 connected to a source of current (not shown).

Disposed just above the upper end 7 of the metal trellis 8 is a cold water supply pipe 10 provided with spray nozzles 11 which are oriented in the direction of the outer inclined wall 5.

Disposed above the pipe 10 is a hot water supply pipe 12. This pipe 12 is of large diameter and provided, in the same way as the pipe 10, with spray nozzles 13 which are oriented in the direction of the outer inclined wall 5. The pipes 10 and 12 are protected by a case or shield 14 which may be heat insulated.

This installation operates in the following manner:

When the temperature of the air (which enters the tower as shown by the arrows A in FIGS. 1 and 2, is such that ice is liable to be formed on the liquid streaming surfaces inside the tower, cold water is sprayed by way of the nozzles 11 of the pipe 10. A curtain of ice 15, as shown in FIG. 4, is gradually formed on the metal trellis 8. This curtain may not only cover the metal trellis 8 but also extend below the trellis at 16, as shown in FIG. 4, if the amount of water sprayed through the nozzles 11 is sufficient.

In this way, the apertures for the entry of air into the cooling tower T may be partly closed and this decreases the flow of air entering the cooler and consequently avoids an excessively low temperature in the streaming devices in the neighborhood of the air inlets, which would otherwise result in the formation of ice in these regions.

When the temperature of the air, and consequently the temperature of the water cooled inside the cooler, resumes a sufficiently high temperature, hot water is sprayed through the nozzles 13 of the pipe 12 at a high rate of flow. Simultaneously, an electric current is supplied to the resistance element 9 so as to melt the ice in the region of this resistance element 9 and cause the curtain of ice to break in this region under the effect of the weight of the lower part 16 of the curtain of ice. A part of the aperture for the entry of the air of the atmosphere is thus very rapidly opened. Thereafter, the hot water streaming along the curtain of ice gradually melts the rest of ice.

I claim:

1. A process for avoiding, in a cold period, the formation of ice inside a cooler having lower air inlet apertures and which employs atmospheric air and a freezable liquid stream, characterized in that said process comprises providing said air inlet apertures with vertical trellises which extend in a part of said apertures from the top of said apertures downwardly, causing, in a cold period, cold water to stream along said trellises so as to form under controlled conditions along said trellises curtains of ice which partly close said apertures and, when the temperature of the air, and consequently the temperature of the water cooled inside the cooler, resumes a sufficiently high temperature to avoid formation of ice inside the cooler, melting the said curtains of ice.

2. A process according to claim 1, wherein the ice is melted by streaming hot water along the curtains of ice.

3. A process according to claim 2, wherein the melting of the curtains of ice is accelerated by heating means which are connected to said trellises and constituted at least some of the elements of said trellises.

4. A process according to claim 3, wherein heating means are disposed in the lower part of said metal trellises.

5. A cooler which employs atmospheric air and a freezable liquid stream and has lower air inlet apertures, characterized in that it comprises vertical trellises which extend in a part of said inlet apertures from the top downwardly of said apertures, means for causing cold water to stream along said trellises, and means for melting the ice formed on said trellises.

6. A cooler according to claim 5, wherein the means for melting the ice comprise means for causing hot water to stream along the ice.

7. A cooler according to claim 6, wherein the means for melting the ice further comprise heating means connected to said trellises and constituting at least some of the elements of said trellises.

8. A cooler according to claim 7, wherein the heating means are disposed at the lower end of said trellises.

9. A cooler according to claim 7 or 8, wherein the heating means are electric resistance elements.

* * * * *